W. F. CLARK.
CULTIVATOR.

No. 61,805.                              Patented Feb. 5, 1867.

United States Patent Office.

WILBUR F. CLARK, OF HAGAMAN'S MILLS, NEW YORK.

Letters Patent No. 61,805, dated February 5, 1867.

IMPROVEMENT IN CULTIVATORS.

The Schedule referred to in these Letters Patent and making part of the same.

TO ALL WHOM IT MAY CONCERN:

Be it known that I, WILBUR F. CLARK, of Hagaman's Mills, in the county of Montgomery, and State of New York, have invented a new and improved Cultivator; and I do hereby declare that the following is a full, clear, and exact description thereof, which will enable those skilled in the art to make and use the same, reference being had to the accompanying drawing, forming part of this specification, in which—

Figure 1:
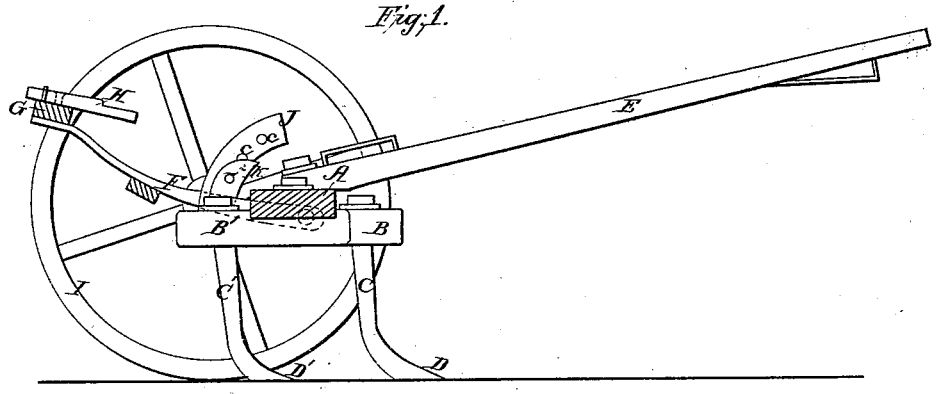
Figure 2:
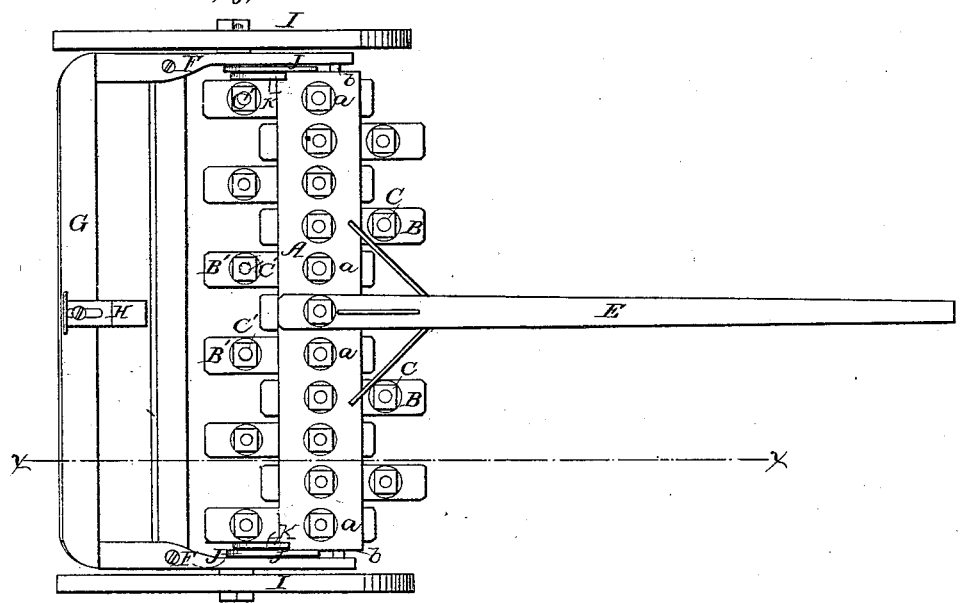

Figure 1 is a side sectional view of my invention taken in the line $x$ $x$, fig. 2.

Figure 2, a plan or top view of the same.

Similar letters of reference indicate corresponding parts.

This invention consists in a novel and improved construction of the cultivator, as hereinafter fully shown and described, whereby the ground will be acted upon in the most efficient manner, and the device be under the complete control of the driver.

The frame of the device consists of a stout plank, A, having its under side grooved transversely to form gains in which bars, B B', are fitted parallel with each other, and firmly secured in position by one bolt, $a$, passing through each and through the plank A. The bars B project in front of the plank A, and the bars B' project behind it, as shown clearly in fig. 2, and in the front ends of the bars B the standards C of teeth D are secured, while the standards C' of teeth D' are secured in the rear ends of the bars B'. E is the draught-pole which is attached to the centre of the plank A, in an inclined position relatively therewith, as shown in fig. 1. The ends of the plank A are secured by journals or pivots, $b$, in the front ends of iron levers F F, the rear ends of which are connected by a bar, G, having the driver's seat, H, attached to it in such a manner that it may be adjusted further forward or backward as required, and to these levers F F, about their centres, the wheels I I are attached. From the above description it will be seen that the driver counterpoises the machine, and that by throwing his body forward or backward at any time, may elevate the ploughs out of the ground or keep them in the ground, as desired. To each lever F there is attached a curved segment, J, which is perforated with holes, $c$, and similar perforated segments, K, are attached to the ends of the plank A. By raising the plank A, and passing pins through the proper perforations in the segments J K, the teeth D D' may be kept above the surface of the ground, and drawn from place to place with the greatest facility. The device, it will be seen, may be constructed at a very moderate cost, is extremely strong and durable, and will operate in the most efficient manner.

Having thus described my invention, I claim as new, and desire to secure by Letters Patent—

1. The plank A, grooved at its under side to receive the bars B B', which have the teeth standards C C' attached as shown, in combination with the levers F F, having the wheels I I attached, the plank A pivoted between their front ends and the driver's seat H, secured to a cross-bar, G, attached to the rear ends of the levers, all arranged substantially as and for the purpose herein set forth.

2. I further claim the perforated segments J K, attached respectively to the levers F F, and plank A, substantially as and for the purpose specified.

WILBUR F. CLARK.

Witnesses:
WILLIAM B. CLARK,
WM. M. PAWLING.